(12) United States Patent
Lee

(10) Patent No.: US 7,483,356 B2
(45) Date of Patent: Jan. 27, 2009

(54) UNIVERSAL MEDIA DISC CLEANING/REPAIRING DEVICE

(76) Inventor: Jean Chin Chu Lee, Room 6, 11th Floor, No. 410, Sec. 5, Jongshiow East Road, Taipei (TW)

( * ) Notice: Subject to any disclaimer, the term of this patent is extended or adjusted under 35 U.S.C. 154(b) by 604 days.

(21) Appl. No.: 11/199,200

(22) Filed: Aug. 9, 2005

(65) Prior Publication Data

US 2007/0036057 A1    Feb. 15, 2007

(51) Int. Cl.
  *G11B 3/58* (2006.01)
  *A47L 25/00* (2006.01)
(52) U.S. Cl. .................. 369/72; 15/97.1; 15/210.1
(58) Field of Classification Search ............ 15/97.1, 15/210.1; 369/72
See application file for complete search history.

(56) References Cited

U.S. PATENT DOCUMENTS 5,963,526 A * 10/1999 Lee .................... 369/72

\* cited by examiner

*Primary Examiner*—Randall Chin
(74) *Attorney, Agent, or Firm*—Rosenberg, Klein & Lee

(57) ABSTRACT

A universal media disc cleaning/repairing device including: a main body having a receptacle for snugly receiving a universal media disc; a driving motor mounted in the main body; a disc driving mechanism rotationally drivable by the driving motor, the disc driving mechanism having a disc driving tray upward protruding from a carrier board section of the main body for rotationally driving the universal media disc placed in the carrier board section; a cleaning/repairing tray pivotally mounted on the main body and rotationally drivable by the driving motor. The cleaning/repairing tray is adapted to contact with lower side of a read/write window of the cartridge of the universal media disc placed in the carrier board section.

13 Claims, 10 Drawing Sheets

UNIVERSAL MEDIA DISC CLEANING/REPAIRING DEVICE

BACKGROUND OF THE INVENTION

1. Field of the Invention

The present invention is related to a universal media disc cleaning/repairing device, and more particularly to a universal media disc cleaning/repairing device applicable to a play station portable (PSP).

2. Description of the Prior Art

The existent universal media disc (UMD) used in a play station portable (PSP) has a cartridge in which a universal media disc is pivotally mounted. Data are stored in the universal media disc for a user to enjoy multimedia entertaining function. The cartridge serves to protect the universal media disc from being damaged when taking or using the universal media disc. However, after a period of use, the memory region of the universal media disc is often inevitably contaminated by dust or incautious touch. This will affect the data reading of the PSP.

In order to clean up the universal media disc, conventionally a clean plush is used to manually tenderly wipe the universal media disc. However, such cleaning measure often results in scrapes on the disc. In addition, the disc can be hardly fully cleaned by such measure. Therefore, the reading of data will be affected.

SUMMARY OF THE INVENTION

It is therefore a primary object of the present invention to provide a universal media disc cleaning/repairing device including: a main body having a carrier board section, a receptacle being formed on the carrier board section for snugly receiving a universal media disc; a driving motor mounted in the main body; a disc driving mechanism rotationally drivable by the driving motor, the disc driving mechanism having a disc driving tray upward protruding from the carrier board section for correspondingly fitting into the center of lower side of the universal media disc placed in the carrier board section so as to rotationally drive the universal media disc; a cleaning/repairing tray pivotally mounted on the main body and rotationally drivable by the driving motor, the cleaning/repairing tray being adapted to contact with lower side of a read/write window of the universal media disc placed in the carrier board section; and a cam pivotally mounted in the main body and drivable by the driving motor, whereby after the cam is rotated by a certain angle, a switch is driven to power off the driving motor to stop cleaning the disc.

It is a further object of the present invention to provide the above universal media disc cleaning/repairing device in which the main body includes a cover body for shading the universal media disc placed in the carrier board section. The cover body has a tongue plate. After the cover body is lifted by a certain angle, the tongue plate presses and switches off a switch to power off the driving motor.

The present invention can be best understood through the following description and accompanying drawings wherein:

DETAILED DESCRIPTION OF THE PREFERRED EMBODIMENTS

Figure 1:
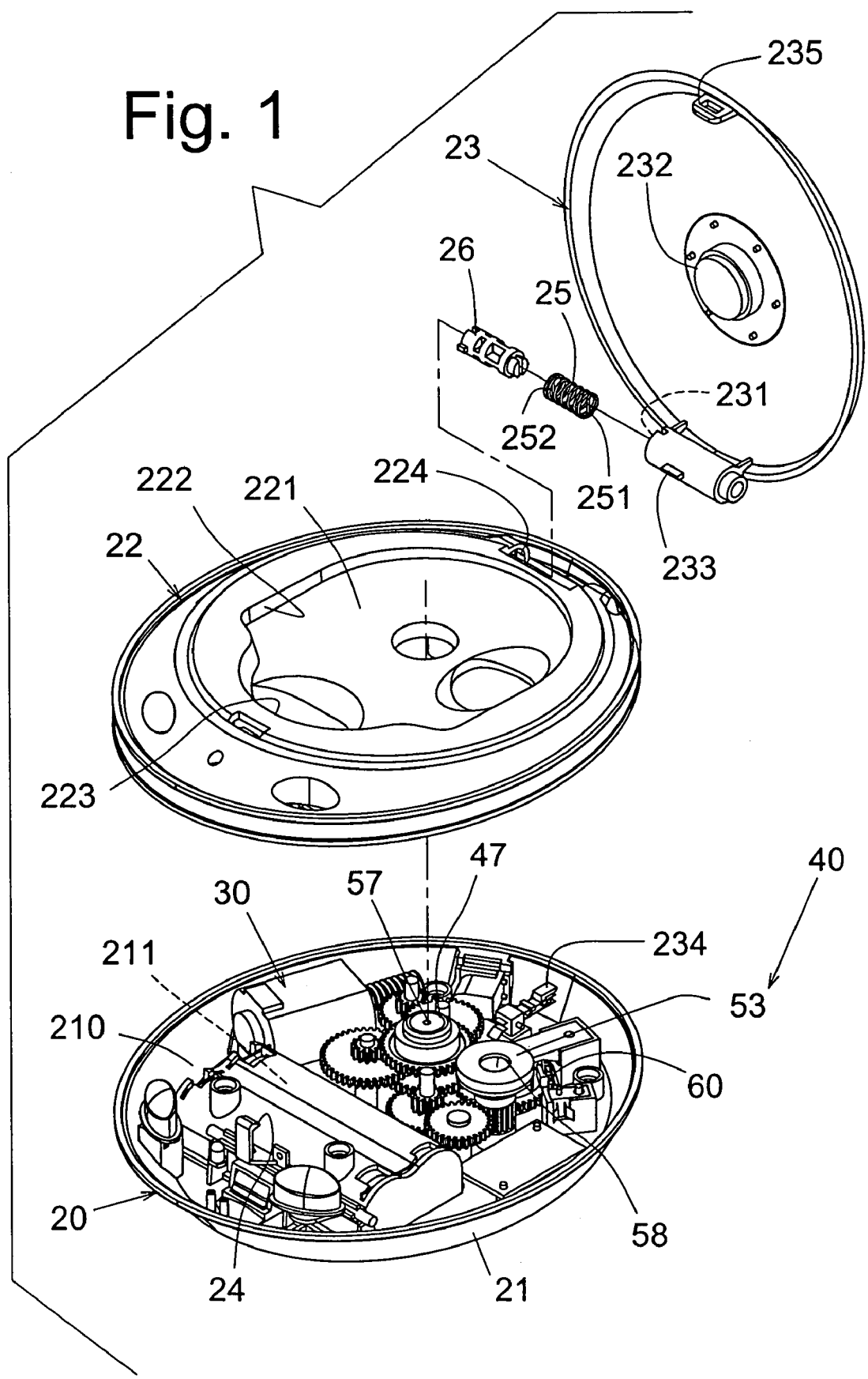
FIG. 1 is a perspective exploded view of the present invention.

Please refer to FIGS. 1 to 10. The universal media disc cleaning/repairing device of the present invention includes: a main body 20 having a carrier board section 221, a receptacle 222 being formed on the carrier board section 221 for snugly receiving a cartridge 72 of a universal media disc 70; a driving motor 30 mounted in the main body 20; a disc driving mechanism 40 rotationally drivable by the driving motor 30, the disc driving mechanism 40 having a disc driving tray 47 upward protruding from the carrier board section 221 for correspondingly fitting into the center of lower side of the universal media disc placed in the carrier board section 221 so as to drive the disc 73 in the universal media disc 70; a cleaning/repairing tray 53 pivotally mounted on the main body 20 and rotationally drivable by the driving motor 30, the cleaning/repairing tray 53 being adapted to contact with lower side of the read/write window 71 of the cartridge 72 of the universal media disc 70; and a cam 56 pivotally mounted in the main body 20. After the cam 56 is rotated by a certain angle, a switch 60 is driven to power off the driving motor 30 and stop cleaning/repairing the disc.

Figure 2:
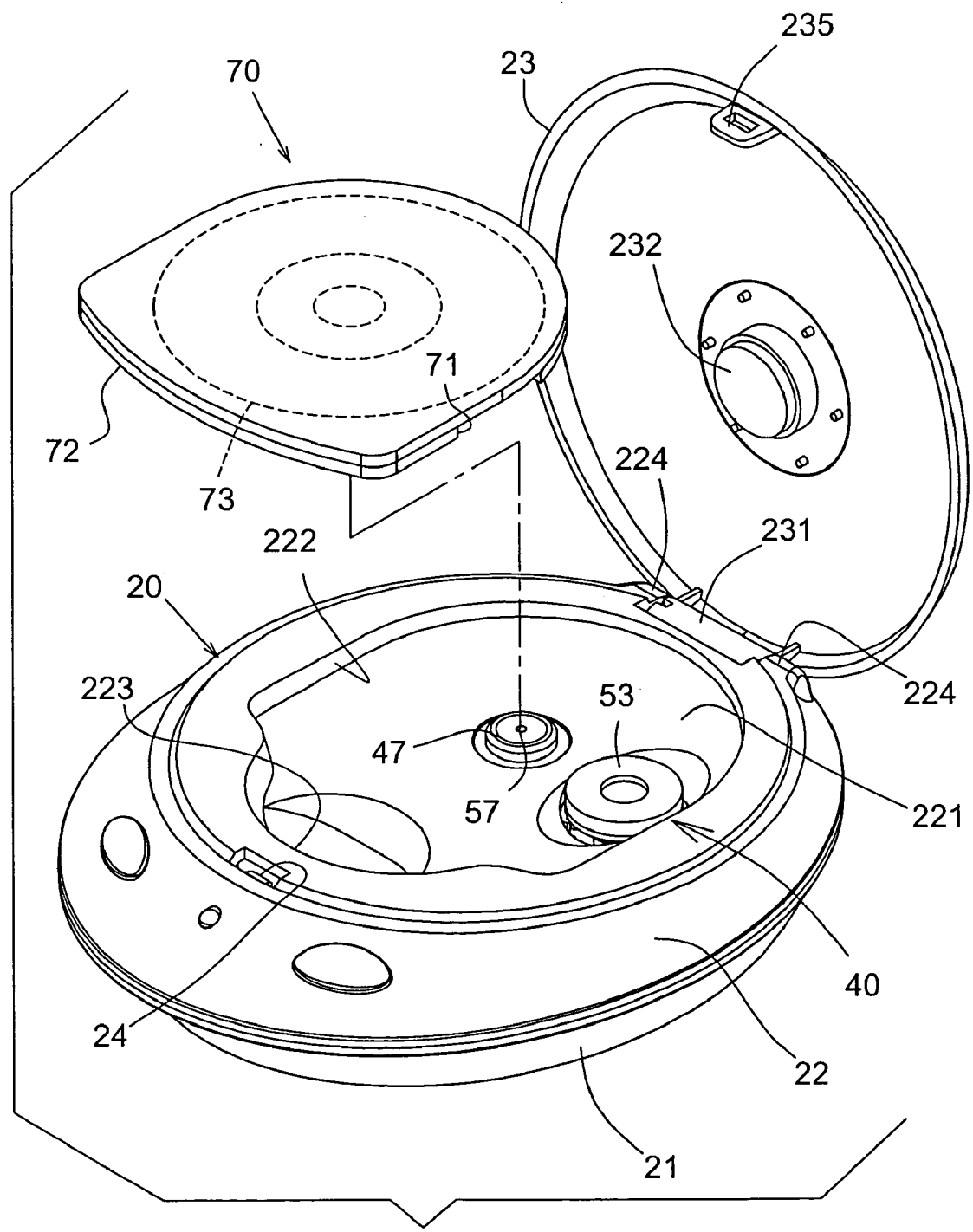
FIG. 2 is a perspective view showing that the cover body of the present invention is lifted and opened.
Figure 3:
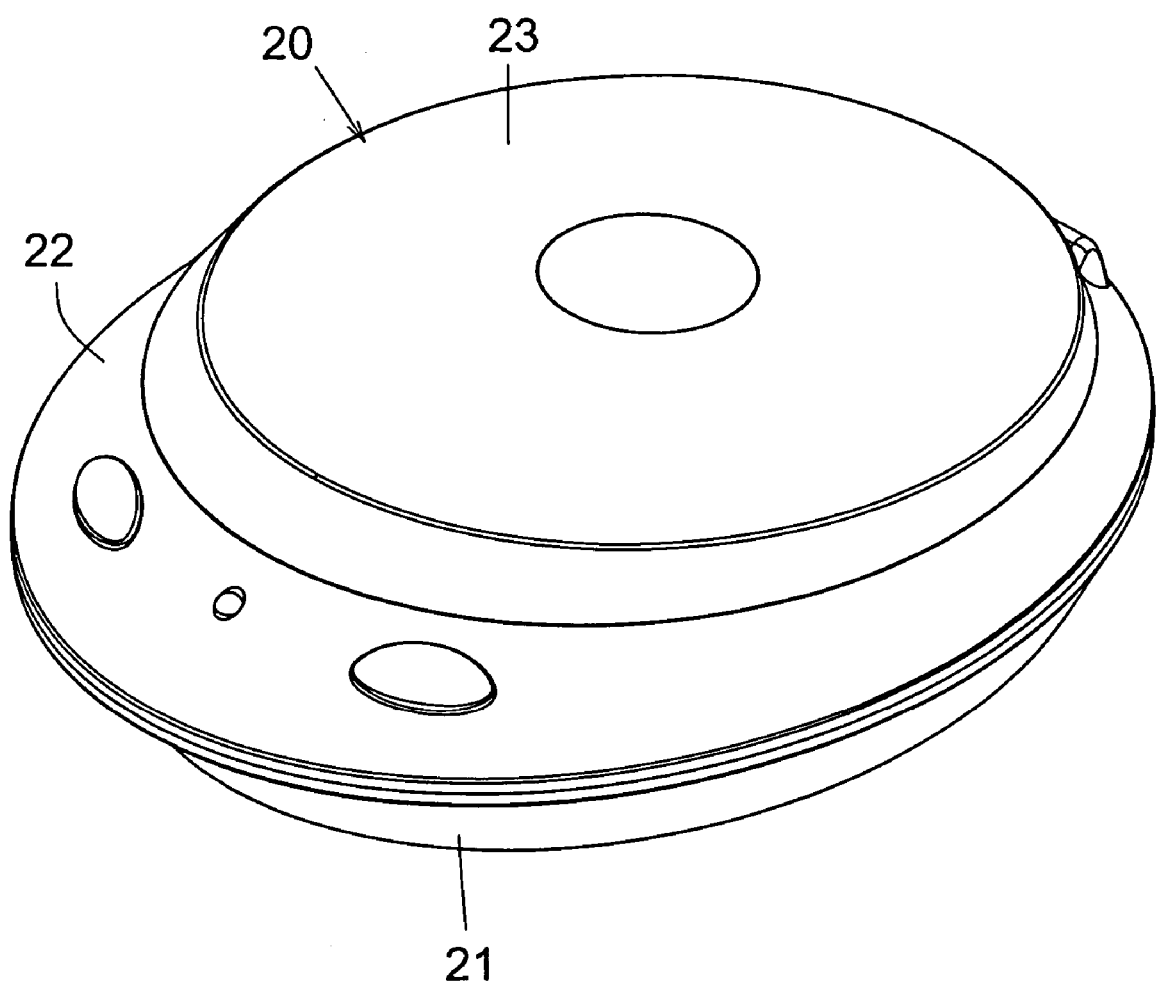
FIG. 3 is a perspective assembled view of the present invention.

Referring to FIGS. 1, 2 and 3, the main body 20 of the universal media disc cleaning/repairing device of the present invention includes a base seat 21 having a cell box 211 for accommodating cells therein. The cells provide power for the driving motor 30 to rotate. The main body 20 further includes a middle seat body 22 overlaid on the base seat 21. A receiving chamber 210 is defined between the base seat 21 and the middle seat body 22, in which the driving motor 30 and other components are mounted. A carrier board section 221 is formed on upper side of the middle seat body 22. A receptacle 222 is formed on the carrier board section 221. The receptacle 222 has a shape corresponding to the shape of the cartridge 72 of the universal media disc 70. A finger dent 223 is formed on outer circumference of the receptacle 222, whereby a user's finger can extend into the finger dent 223 for taking the universal media disc 70. The main body 20 further includes a cover body 23 pivotally connected with the middle seat body 22. The cover body 23 has a latch member 235. The middle seat body 22 has a resilient arresting hook or latch hole 24. The cover body 23 can be closed onto the middle seat body 22 with the latch member 235 fixedly latched with the arresting hook 24.

The main body 20 further includes a torque spring 25 having two ends 251, 252 respectively abutting against the cover body 23 and the middle seat body 22. The torque spring 25 always exerts a lifting force onto the cover body 23. After the latch member 235 of the cover body 23 is unlatched from the arresting hook or latch hole 24, the cover body 23 can automatically bound upward.

The cover body 23 has a sleeve 231 pivotally mounted between a pair of pivot seats 224 of the middle seat body 22. The torque spring 25 and a damping shaft 26 are axially sequentially fitted in the sleeve 231. The first end 251 of the torque spring 25 is hooked with a first end of the sleeve 231. The second end 252 of the torque spring 25 is hooked with a first end of the damping shaft 26. A second end of the damping shaft 26 is axially inserted in the pivot seat 224 of the middle seat body 22. A high frictional coefficient damping oil is filled between the damping shaft 26 and the sleeve 231. After the latch member 235 of the cover body 23 is unlatched from the arresting hook or latch hole 24 of the middle seat body 22, the cover body 23 will gradually automatically bound upward.

A press member 232 is fixedly disposed under the bottom of the cover body 23. When the cover body 23 is closed onto the middle seat body 22, the press member 232 presses down the cartridge 72 of the universal media disc 70 placed on the carrier board section 221 of the middle seat body 22.

Referring to FIGS. 1, 4, 5, 6, 7 and 8, the rotary shaft 57 of the disc driving mechanism 40 of the universal media disc cleaning/repairing device of the present invention is pivotally connected in the main body 20. A gear section 46 is arranged along outer circumference of the rotary shaft 57. The gear section 46 via gears 45, 44, 43 and a spiral gear 42 is engaged with a worm 41 disposed on the rotary shaft of the driving motor 30. Accordingly, the driving gear 30 can sequentially via the worm 41, spiral gear 42, gears 45, 44, 43 and the gear section 46 drive the rotary shaft 57 of the disc driving mechanism 40.

A gear section 52 is disposed along outer circumference of the rotary shaft 58 of the cleaning/repairing tray 53 of the universal media disc cleaning/repairing device of the present invention. A gear set composed of multiple gears is pivotally connected in the main body 20 between the gear section 52 and the worm 41 of the rotary shaft of the driving motor 30. Accordingly, the worm 41 can indirectly drive the cleaning/repairing tray 53. Alternatively, the gear section 52 of the rotary shaft 58 of the cleaning/repairing tray 53 can be directly engaged with the worm 41 of the rotary shaft of the driving motor 30, whereby the driving motor 30 can directly drive the cleaning/repairing tray 53.

The cam 56 has a rotary shaft 59 pivotally mounted in the main body 20. A gear section 55 is disposed along outer circumference of the rotary shaft 59 and engaged with the gear 54 coaxially rotatable with the gear section 46. Accordingly, the cam 56 is rotationally drivable by the rotary shaft 57 of the disc driving mechanism 40. The cam 56 has an escape notch 561.

Figure 4:
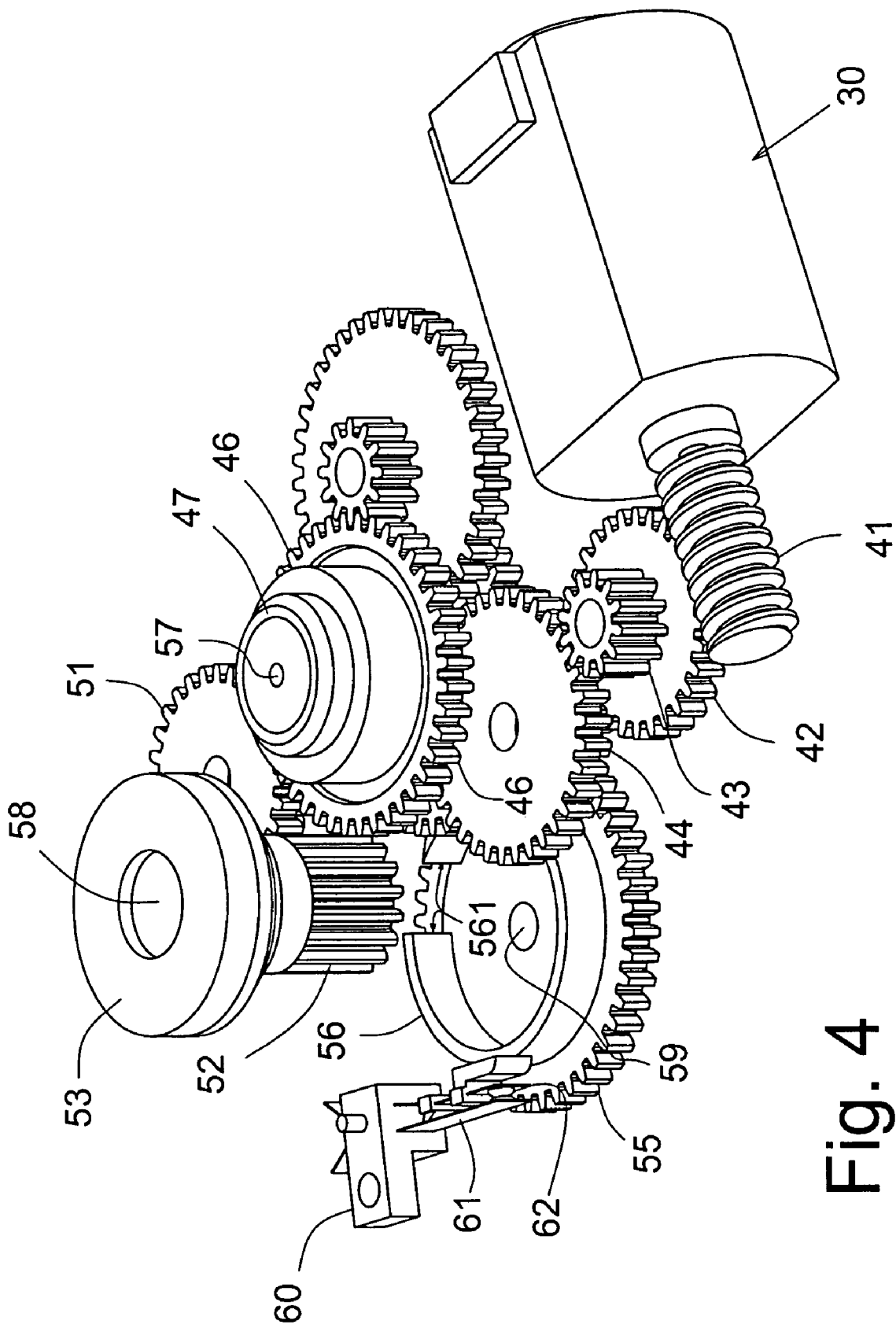
FIG. 4 is a top perspective view of the present invention, showing the transmission relationship between the driving motor, gears and cleaning/repairing tray, in which the two resilient contact plates of the switch contact with each other.
Figure 5:
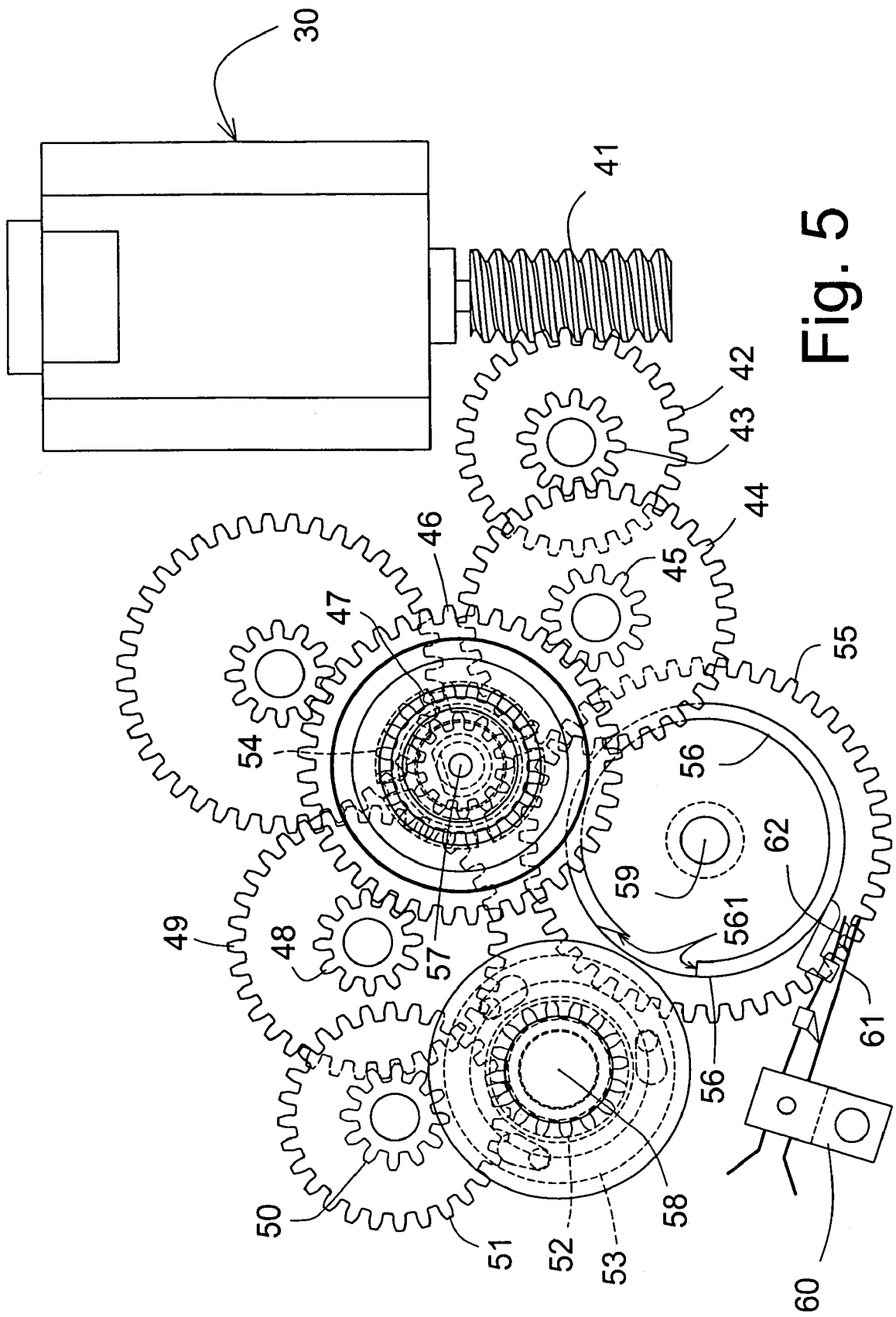
FIG. 5 is a plane view of the present invention, showing the transmission relationship between the driving motor, gears and cleaning/repairing tray, in which the two resilient contact plates of the switch contact with each other.
Figure 8:
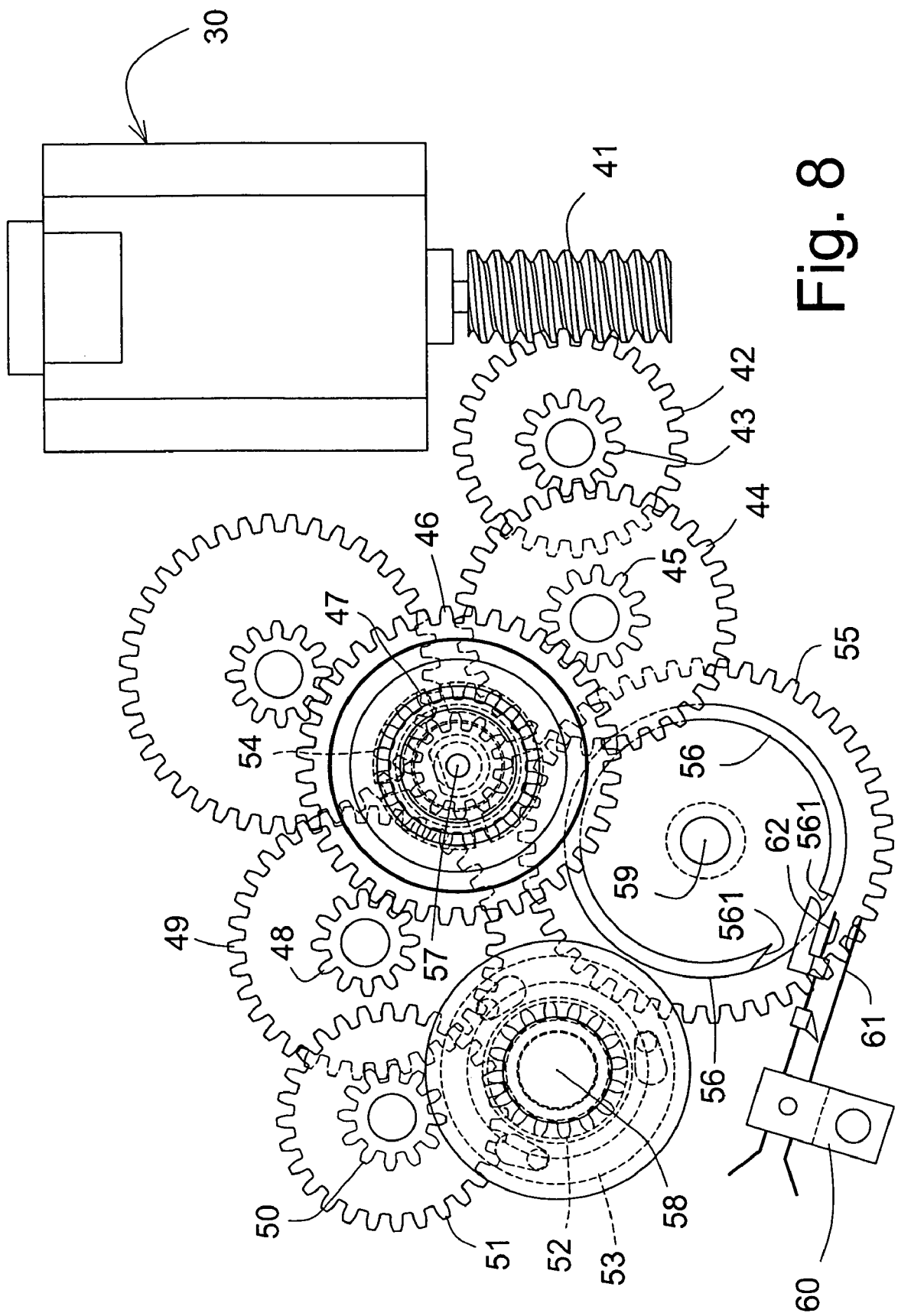
FIG. 8 is a plane view of the present invention, showing the transmission relationship between the driving motor, gears and cleaning/repairing tray, in which the two resilient contact plates of the switch bound away from each other.
Figure 9:
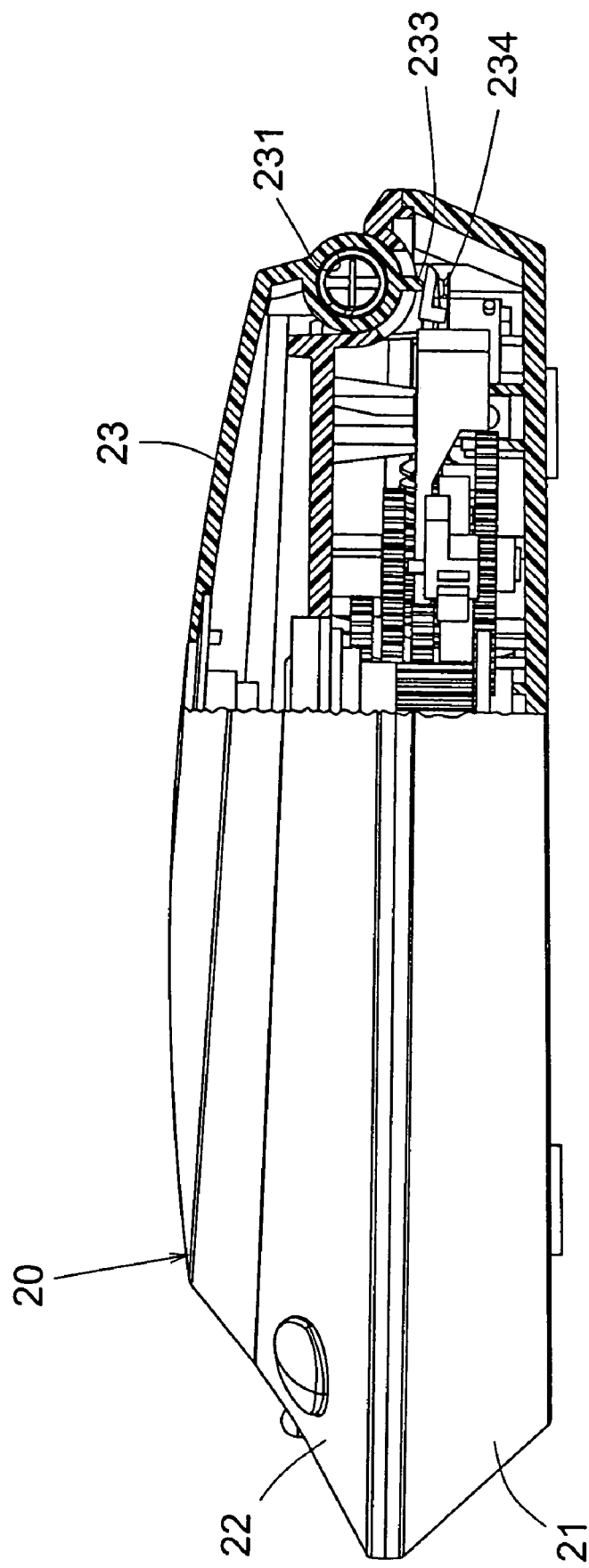
FIG. 9 is a partially sectional view of the present invention.
Figure 10:
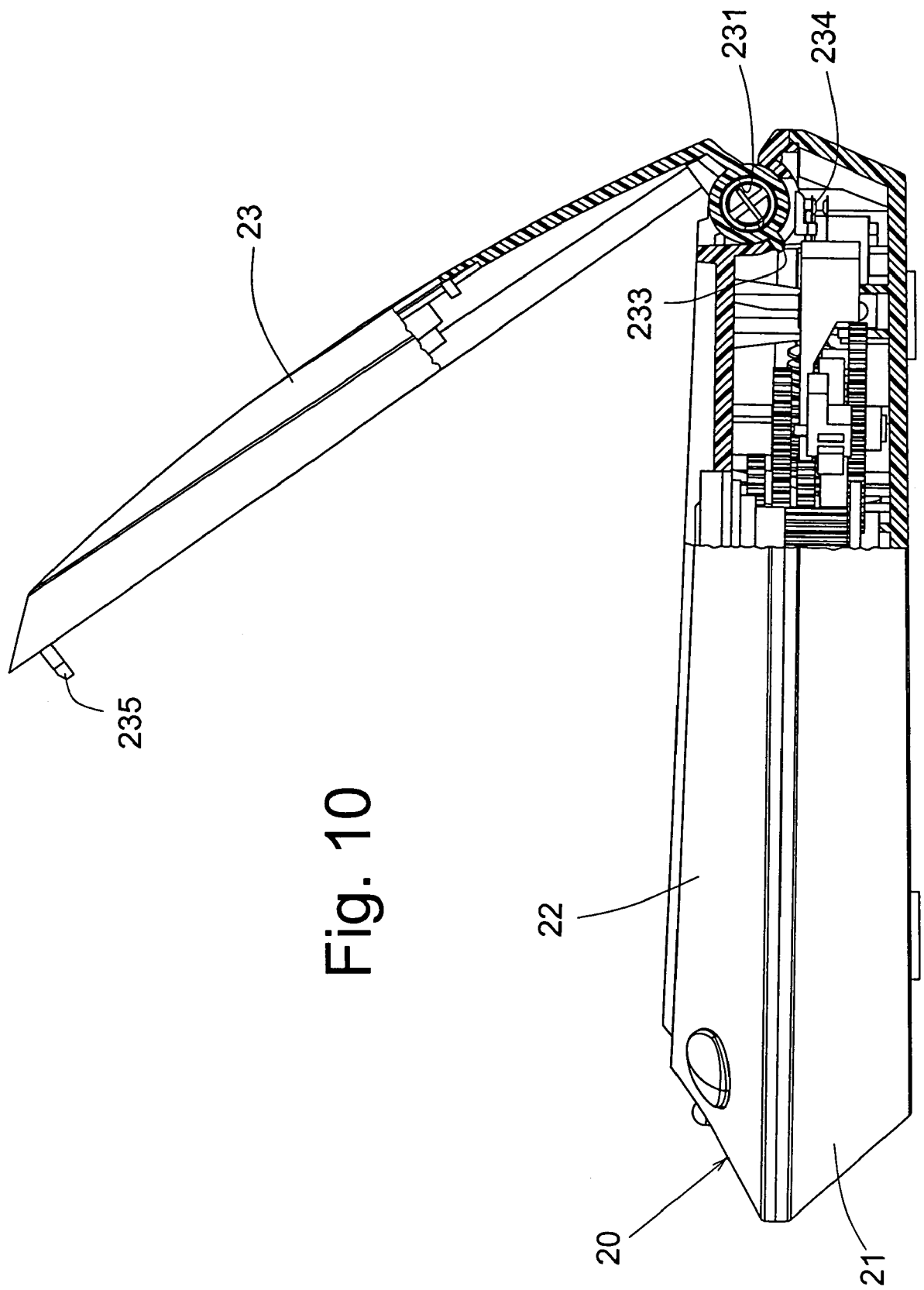
FIG. 10 is a partially sectional view according to FIG. 9, in which the cover body is lifted.

Referring to FIG. 4, when the universal media disc cleaning/repairing device is activated to clean/repair the universal media disc 70, the cam 56 is driven by the rotary shaft 57 of the disc driving mechanism 40 to rotate. At this time, the rim of the cam 56 pushes a switch 60 to make two resilient contact plates 61, 62 of the switch 60 contact with each other to close the circuit. After the cam 56 revolves by one circle or a certain angle, as shown in FIG. 8, the cam 56 can avoid the resilient contact plates 61, 62 of the switch 60 by means of the escape notch 561. At this time, the resilient contact plates 61, 62 bound away from each other to open the circuit. Under such circumstance, the driving motor 30 is powered off and the universal media disc 70 is cleaned/repaired once.

Figure 6:
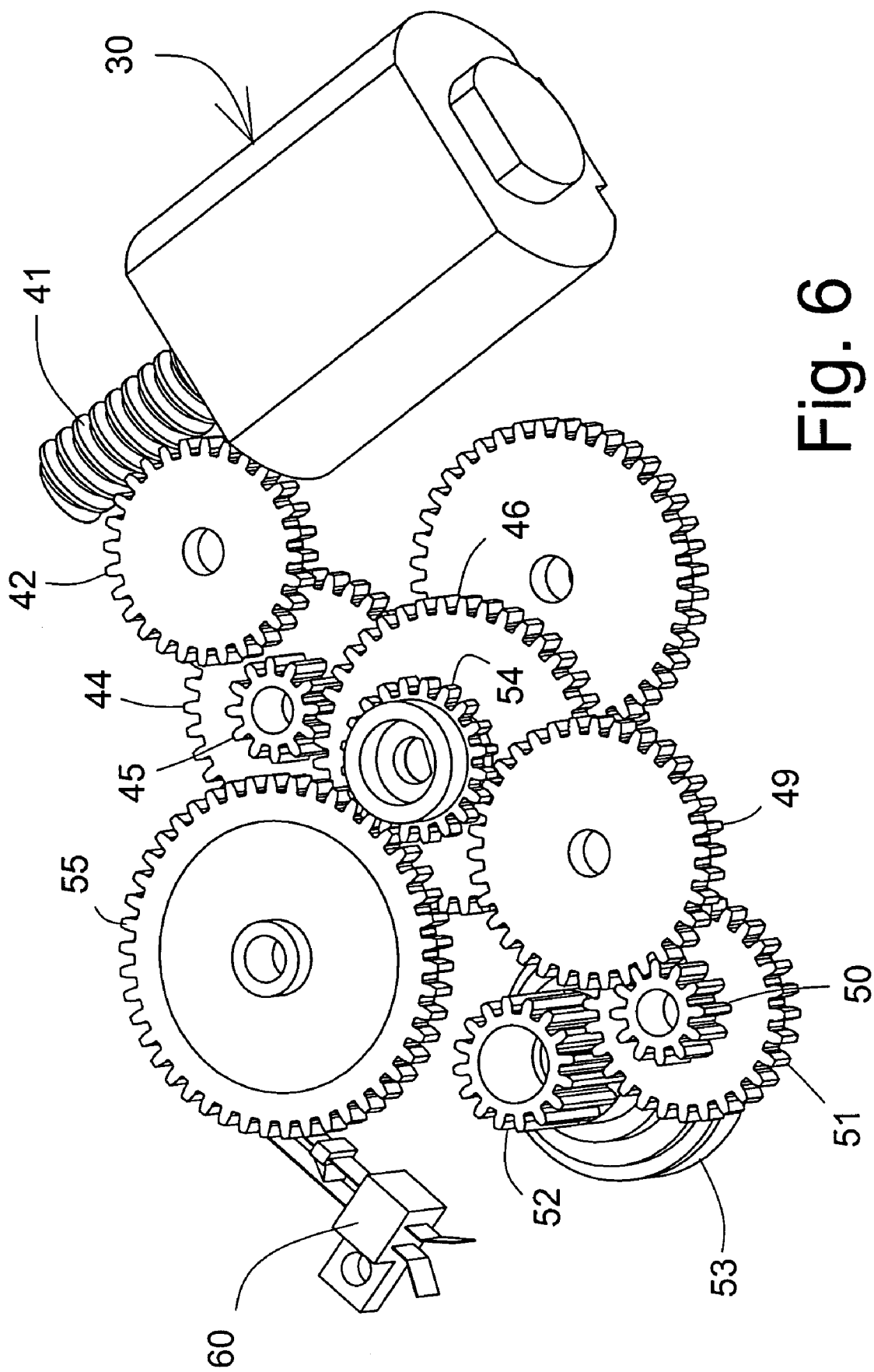
FIG. 6 is a bottom perspective view of the present invention, showing the transmission relationship between the driving motor, gears and cleaning/repairing tray, in which the two resilient contact plates of the switch contact with each other.
Figure 7:
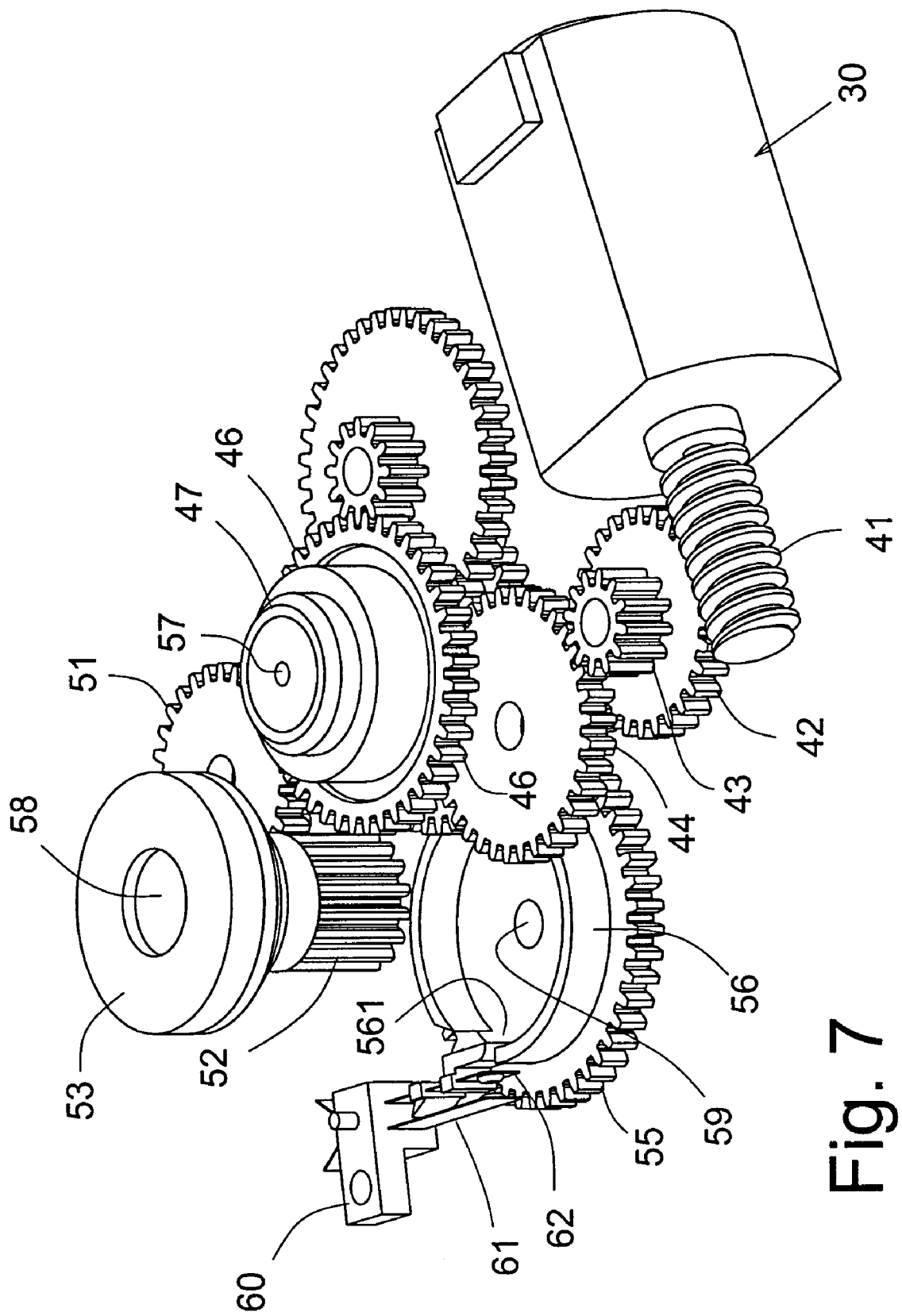
FIG. 7 is a bottom perspective view of the present invention, showing the transmission relationship between the driving motor, gears and cleaning/repairing tray, in which the two resilient contact plates of the switch bound away from each other.

Referring to FIGS. 1, 6 and 7, the cover body 23 further includes a tongue plate 233. After the cover body 23 is lifted by a certain angle, the tongue plate 233 drives and switches off a switch 234 to power off the driving motor 30. This ensures that in any state, once the cover body 23 is lifted, the driving motor 30 stops.

After the universal media disc cleaning/repairing device of the present invention is activated, the disc driving mechanism 40 and the cleaning/repairing tray 53 can be rotated in the same direction or in different directions. This is not limited.

According to the above arrangement, the present invention has the following advantages:

1. By means of the cam 56, after the cleaning procedure is completed once, the universal media disc cleaning/repairing device will automatically stop operating.

2. No matter in what state the universal media disc cleaning/repairing device is, once the cover body 23 is lifted, the driving motor 30 will stop operating so as to ensure safety.

The above embodiments are only used to illustrate the present invention, not intended to limit the scope thereof. Many modifications of the above embodiments can be made without departing from the spirit of the present invention.

What is claimed is:

1. A universal media disc cleaning/repairing device comprising:
   (a) a main body having a carrier board section, a receptacle being formed on the carrier board section for snugly receiving a universal media disc;
   (b) a driving motor mounted in the main body;
   (c) a disc driving mechanism rotationally drivable by the driving motor, the disc driving mechanism having a disc driving tray upward protruding from the carrier board section for correspondingly engaging the universal media disc placed in the carrier board section so as to rotationally drive the universal media disc;
   (d) a cleaning/repairing tray pivotally mounted on the main body and rotationally drivable by the driving motor, the cleaning/repairing tray being disposed to oppose a read/write window of the universal media disc placed in the carrier board section; and
   (e) a cam pivotally mounted in the main body and drivable by the driving motor, whereby after the cam is rotated by a certain angle, a switch is driven to power off the driving motor.

2. The universal media disc cleaning/repairing device as claimed in claim 1, wherein the main body includes: a base seat having a cell box for accommodating cells therein for providing power for the driving motor; a middle seat body overlaid on the base seat, a receiving chamber being defined between the base seat and the middle seat body, at least the driving motor being mounted in the receiving chamber, the carrier board section being formed on the middle seat body, the receptacle being formed on the carrier board section, the receptacle having a shape corresponding to the shape of the universal media disc, a finger dent being formed about the receptacle; and a cover body pivotally connected with the middle seat body, the cover body having a latch member, whereby when the cover body is closed onto the middle seat body, the latch member is latched with the middle seat body.

3. The universal media disc cleaning/repairing device as claimed in claim 2, wherein the middle seat body has a resilient arresting hook, whereby when the cover body is closed onto the middle seat body, the latch member of the cover body is latched with the arresting hook.

4. The universal media disc cleaning/repairing device as claimed in claim 2, wherein the middle seat body has a latch hole, whereby when the cover body is closed onto the middle seat body, the latch member of the cover body is latched in the latch hole.

5. The universal media disc cleaning/repairing device as claimed in claim 2, wherein the main body further includes a torque spring having two ends respectively abutting the cover body and the middle seat body, the torque spring exerting a lifting force onto the cover body, whereby the cover body is biased upward.

6. The universal media disc cleaning/repairing device as claimed in claim 2, wherein the cover body has a sleeve pivotally mounted between a pair of pivot seats of the middle seat body, the torque spring and a damping shaft being axially fitted in the sleeve, a first end of the torque spring being hooked with a first end of the sleeve, a second end of the torque spring being hooked with a first end of the damping shaft, a second end of the damping shaft being axially inserted in the pivot seat of the middle seat body, a high frictional coefficient damping oil being filled between the damping shaft and the sleeve, whereby the cover body is biased upward.

7. The universal media disc cleaning/repairing device as claimed in claim 2, wherein a press member is fixedly disposed under a bottom of the cover body, whereby when the cover body is closed onto the middle seat body, the press member presses down the universal media disc placed on the carrier board section of the middle seat body.

8. The universal media disc cleaning/repairing device as claimed in claim 2, wherein the cover body further includes a tongue plate, whereby after the cover body is lifted by a certain angle, the tongue plate drives and switches off a switch to power off the driving motor.

9. The universal media disc cleaning/repairing device as claimed in claim 1, wherein a rotary shaft of the disc driving tray is pivotally connected in the main body, a gear section being arranged along outer circumference of the rotary shaft, the gear section being directly engaged with a worm disposed on a rotary shaft of the driving motor.

10. The universal media disc cleaning/repairing device as claimed in claim 1, wherein a rotary shaft of the disc driving tray is pivotally connected in the main body, a gear section being arranged along outer circumference of the rotary shaft, a gear set having multiple gears being disposed between the gear section of the disc driving tray and a worm disposed on a rotary shaft of the driving motor.

11. The universal media disc cleaning/repairing device as claimed in claim 1, wherein a rotary shaft of the cleaning/repairing tray is pivotally connected in the main body, a gear section being arranged along outer circumference of the rotary shaft, the gear section being directly engaged with a worm disposed on a rotary shaft of the driving motor.

12. The universal media disc cleaning/repairing device as claimed in claim 1, wherein a rotary shaft of the cleaning/repairing tray is pivotally connected in the main body, a gear section being arranged along outer circumference of the rotary shaft, a gear set having multiple gears being disposed between the gear section of the cleaning/repairing tray and a worm disposed on a rotary shaft of the driving motor.

13. The universal media disc cleaning/repairing device as claimed in claim 1, wherein a rotary shaft of the cam is pivotally connected in the main body, a gear section being arranged along outer circumference of the rotary shaft, the gear section being engaged with a gear rotationally drivable by the driving motor.

* * * * *